United States Patent
Nomura

(10) Patent No.: US 9,207,326 B2
(45) Date of Patent: Dec. 8, 2015

(54) COMMUNICATION SYSTEM, TRANSMISSION DEVICE AND RECEIVING DEVICE

(71) Applicant: DENSO CORPORATION, Kariya, Aichi-pref. (JP)

(72) Inventor: Jun Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 14/260,796

(22) Filed: Apr. 24, 2014

(65) Prior Publication Data

US 2014/0335888 A1    Nov. 13, 2014

(30) Foreign Application Priority Data

May 8, 2013    (JP) .................................. 2013-098805

(51) Int. Cl.
*H04W 24/00* (2009.01)
*G01S 19/04* (2010.01)
*H04L 29/08* (2006.01)
*B60W 30/16* (2012.01)
*G01S 5/00* (2006.01)

(52) U.S. Cl.
CPC ................ *G01S 19/04* (2013.01); *B60W 30/16* (2013.01); *G01S 5/0045* (2013.01); *H04L 67/12* (2013.01); *H04L 67/18* (2013.01)

(58) Field of Classification Search
CPC ....... G01S 19/04; G01S 5/0045; H04L 67/12; H04L 67/18; B60W 30/16
USPC .......... 455/456.1, 456.2, 456.3, 456.4, 456.5, 455/456.6, 457
See application file for complete search history.

(56) References Cited

U.S. PATENT DOCUMENTS

| 7,903,005 | B2 * | 3/2011 | Ueda ............................... 341/83 |
| 2006/0218374 | A1 * | 9/2006 | Ebert ............................... 712/5 |
| 2010/0289675 | A1 * | 11/2010 | Ueda ............................... 341/83 |

FOREIGN PATENT DOCUMENTS

| EP | 1 705 500 | A1 | 9/2006 | |
| EP | 1705500 | A1 * | 9/2006 | ............. G01S 13/87 |
| JP | 2005-328283 | A | 11/2005 | |
| JP | 2006-287738 | A | 10/2006 | |
| JP | 2010-038850 | A | 2/2010 | |
| JP | 2010-134562 | A | 6/2010 | |
| JP | 2012-085202 | A | 4/2012 | |

OTHER PUBLICATIONS

Extended European Search Report dated Sep. 12, 2014 issued in corresponding EP patent application No. 14166317.9.

* cited by examiner

*Primary Examiner* — Shahriar Behnamian
(74) *Attorney, Agent, or Firm* — Posz Law Group, PLC

(57) ABSTRACT

In a communication system, a transmitting unit divides each of latitude data and longitude data of a current location transmitted from a GPS receiver, at a predetermined digit position, into high order data and low order data. The transmitting unit makes a high order frame containing the high order data of each of the latitude data and the longitude data, and a low order frame containing the low order data of each of the latitude data and the longitude data, and transmits the high order frame and the low order frame, independently to a CAN bus. A receiving unit combines the high and low order data regarding the latitude data together, and further combines the high and low order data regarding the longitude data, extracted from the received high and low order frames in order to reconstruct the latitude data and the longitude data of the current location.

6 Claims, 3 Drawing Sheets dd°, ddd° : (SECOND COMPONENTS OF LATITUDE DATA AND LONGITUDE DATA)
mm.mmmmmmm' : (DEGREE COMPONENTS OF LATITUDE DATA AND LONGITUDE DATA)

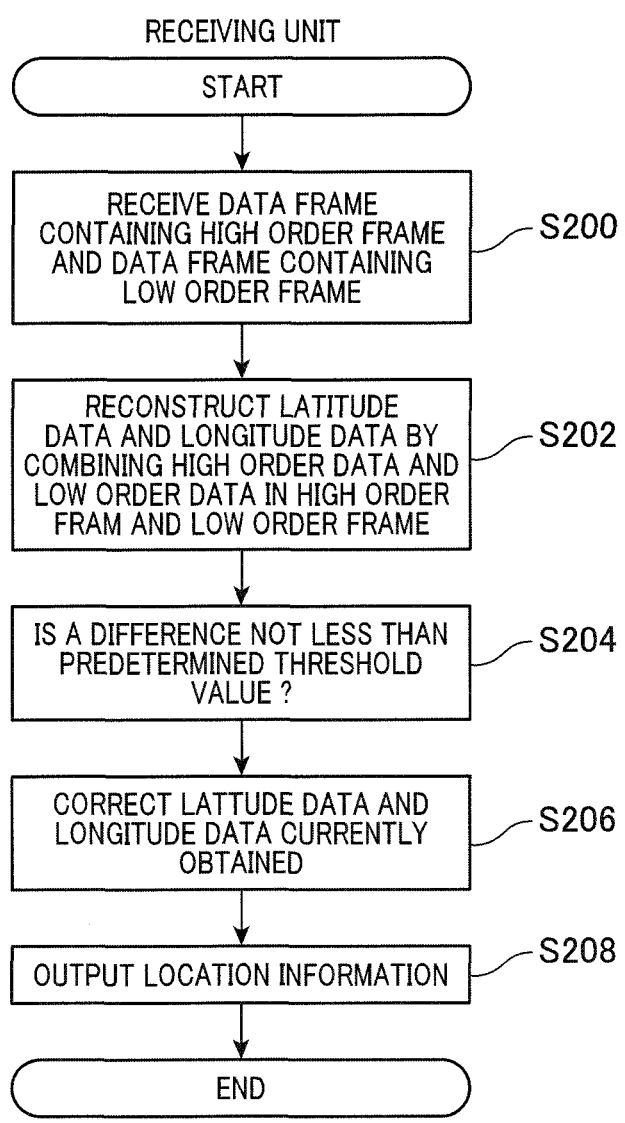

COMMUNICATION SYSTEM, TRANSMISSION DEVICE AND RECEIVING DEVICE

CROSS-REFERENCE TO RELATED APPLICATION

This application is related to and claims priority from Japanese Patent Application No. 2013-98805 filed on May 8, 2013, the contents of which are hereby incorporated by reference.

BACKGROUND OF THE INVENTION

1. Field of the Invention

The present invention relates to communication systems, for example mounted to motor vehicles, each of which has a transmitting device and a receiving device capable of transmitting and receiving communication data between the transmitting device and the receiving device through a communication network.

2. Description of the Related Art

There have been proposed various techniques for an adaptive cruise control system to be mounted to motor vehicles and to perform a high precision adaptive cruise control on the basis of high-accuracy current location information obtained by a real time kinetic global positioning system (RTK-GPS). A GPS receiver receives high resolution data detected by RTK-GPS which contain latitude and longitude information. The GPS receiver transmits the received high resolution data to each of electronic control units (ECU) through an in-vehicle communication network such as a local interconnect network on the basis of communication protocols. However, such high resolution data having high precision latitude and longitude information detected by RTK-GPS has a large data volume (or a large bit length), when compared with the data volume of data used in a conventional in-vehicle communication network. This causes a problem of the high resolution data exceeding a permissible data size of a data frame, which is a transmission unit, used by the data transmission of the in-vehicle communication system. In other words, it is difficult for the conventional communication system to transmit high resolution data containing latitude data and longitude data in a single transmission.

By the way, a patent document, Japanese patent laid open publication No. 2010-134562, discloses a technique for dividing original data as high resolution data obtained by a steering angle sensor into high order data and low order data, and transmitting different data frames which contain the high order data and the high order data, respectively. When receiving both the data frame containing the high order data and the data frame containing the low order data, a device combines them together in order to reconstruct the original data.

As previously described, it is difficult for the conventional techniques to transmit high resolution data in a single transmission. In general, there is a possibility of causing a transmission delay of data frames or one or more data frames being lost in a data communication of an in-vehicle communication system through a communication bus under a high communication load. In general, such an in-vehicle communication system uses CAN communication protocols.

When location information representing a current location of a motor vehicle is divided into high order data and low order data, and the divided data is transmitted through the communication bus, there is a possibility for a receiver not to receive one or more divided data due to a data transmission delay or loss of one or more data frames. In this case, because the receiver cannot receive correct data representing the current location information, i.e. receive insufficient data, the adaptive cruise control system performs the adaptive cruise control on the basis of the received insufficient amount of the current location data, and it becomes difficult to correctly and precisely perform the adaptive cruise control for the motor vehicle.

SUMMARY

It is therefore desired to provide a communication system having a transmitting device and a receiving device capable of avoiding occurrence of a data transmission delay and loss of a part of data when transmitting high resolution location data containing latitude and longitude information of a current location of a motor vehicle through a communication bus in an in-vehicle communication network.

An exemplary embodiment provides a communication system having an acquiring section, a dividing section, a generating section, a transmitting section, a receiving section, a reconstructing section and an output section. The acquiring section acquires latitude data and longitude data of a current location transmitted from a current location detection section. For example, the location detection section detects the current location of a motor vehicle on which the communication system is mounted. The latitude data indicates the latitude of a current location of the motor vehicle. The longitude data indicates the longitude of the current location of the motor vehicle. The dividing section divides the latitude data and the longitude data representing the current location acquired by the acquiring section, at a predetermined digit position, into high order data and low order data of the latitude and high order data and low order data of the longitude, respectively. The generating section generates a high order frame and a low order frame in which the high order frame contains the high order data of the latitude and the high order data of the longitude, and the low order frame contains the low order data of the latitude and the low order data of the longitude. The transmitting section transmits the high order frame and the low order frame generated by the generating section, respectively, in different transmission data to a predetermined communication network.

The receiving section receives the high order frame and the low order frame transmitted from the transmitting section. The reconstructing section extracts the high order data of the latitude in the high order frame and the low order data of the latitude in the low order frame, and combines the extracted data. Further, the reconstructing section extracts the high order data of the longitude in the high order frame and the low order data of the longitude in the low order frame, and reconstructs current latitude data and current longitude data of the current location, and combines the extracted data. The output section outputs the current latitude data and the current longitude data representing the current location reconstructed by the reconstructing section.

In the communication network system according to an exemplary embodiment of the present invention, latitude data and longitude data of a current location acquired by the acquiring section (for example, a GPS receiver) are divided at a predetermined digit position into high order data and low order data of the latitude, and high order data and low order data of the longitude, respectively. Further, a high order frame and a low order frame are independently transmitted. The high order frame contains the high order data of the latitude and the high order data of the longitude. The low order frame contains the low order data of the latitude and the low order data of the longitude. Because the latitude data and the longitude data are divided into the high order data and the low order data, it is possible to decrease a transmission data size of the latitude data and the longitude data, and transmit and receive the latitude data and longitude data of a high resolution through a communication network such as an in-vehicle local area network (in-vehicle LAN). The in-vehicle network uses CAN communication protocols.

In the exemplary embodiment, the high order frame and the low order frame are generated so that the high order frame contains the high order data of the latitude data and the high order data of the longitude data, and the low order frame contains the low order data of the latitude data and the low order data of the longitude data. The transmitting section transmits the high order frame and the low order frame independently to the receiving section through the communication network. This makes it possible to avoid influence of an incorrect data transmission such as a data transmission delay and loss of data frames on the communication network. For example, even if an incorrect data transmission such as a data transmission delay and loss of data frames occurs in one of the high order frame and the low order frame (which forms a pair), because the frame correctly received by the receiving section contains at least one of high order digits or low order digits of the latitude data and the longitude data, this makes it possible to avoid an occurrence of an incorrect carry processing of the latitude component and the longitude component of the current location of the own motor vehicle.

On the other hand, even if an incorrect data transmission such as a data transmission delay and loss of data frames occurs in the high order frame only, high order digits in the latitude data and the longitude data have few changes caused when the current location of the own vehicle is shifted. In other words, such high order digits in the latitude data and the longitude data are almost not changed within a short period of time even if the current location of the own motor vehicle changes. It is therefore possible to easily and precisely correct the latitude data and the longitude data of the current location on the basis of the high order digits of the previous latitude data and previous longitude data previously obtained and the low order frame which can be correctly received. This makes it possible to eliminate influence of an incorrect data transmission such as a data transmission delay and loss of data frames.

As previously described, it is possible for the communication system according to the exemplary embodiment of the present invention to suppress influence of an incorrect data transmission such as a data transmission delay and loss of data frames when the communication system transmits and receives high resolution latitude data and high resolution longitude data through the communication network. As a result, it is possible for the vehicle control section to perform a correct control of the own vehicle on the basis of the correct latitude data of a high resolution and the correct longitude data of a high resolution.

BRIEF DESCRIPTION OF THE DRAWINGS

A preferred, non-limiting embodiment of the present invention will be described by way of example with reference to the accompanying drawings, in which:

FIG. 4 is a flow chart showing a receiving process and a reconstruction process performed by a receiving section in the in-vehicle communication system according to the exemplary embodiment of the present invention shown in FIG. 1.

DETAILED DESCRIPTION OF THE PREFERRED EMBODIMENTS

Figure 1:
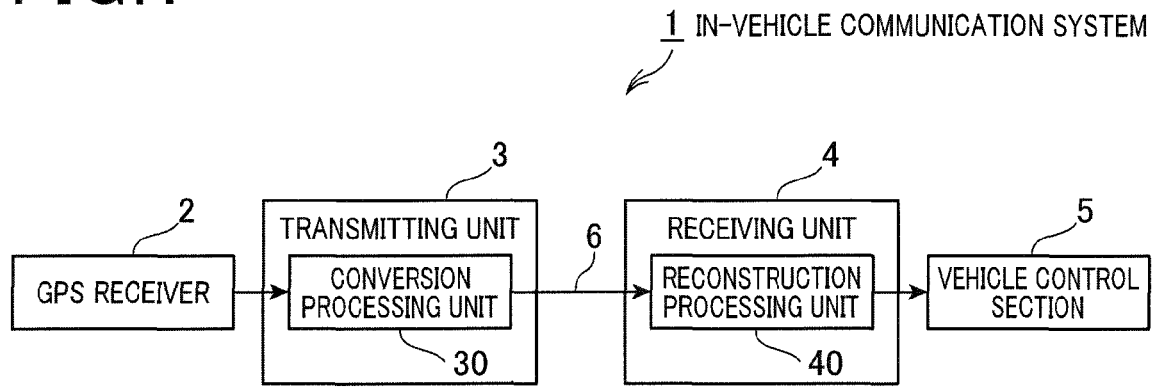
FIG. 1 is a view showing a schematic structure of an in-vehicle communication system according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of an in-vehicle communication system 1 according to an exemplary embodiment with reference to FIG. 1 to FIG. 4.

FIG. 1 is a view showing a schematic structure of the in-vehicle communication system 1 according to the exemplary embodiment.

[Structure of the In-Vehicle Communication System 1]

As shown in FIG. 1, the in-vehicle communication system 1 according to the exemplary embodiment is comprised of a global positioning system receiver (GPS receiver) 2, a transmitting unit 3, a receiving unit 4 and a vehicle control section 5. The transmitting unit 3 and the receiving unit 4 are connected to a controller area network (CAN) bus 6 (hereinafter, the CAN bus 6). The CAN bus 6 is a vehicle bus standard designed to allow microcontrollers and devices to communicate with each other in a motor vehicle (hereinafter, the own motor vehicle) without a host computer. The in-vehicle local area network (in-vehicle LAN) uses CAN communication protocols.

The GPS receiver 2 is a detection device mounted to the own motor vehicle. The GPS receiver corresponds to the location detection section used in the claims.

For example, the GPS receiver 2 receives data having a high resolution, approximately ten or several cm resolution, regarding latitude data and longitude data representing a current location of the own motor vehicle on the basis of high resolution measurement method such as a real time kinetic global positioning system (RTK-GPS).

The detection using the RTK-GPS detects a current location of the own motor vehicle on the basis of location data (or position data) transmitted from a GPS satellite and correction observation information transmitted from a known location. The GPS receiver 2 transmits the latitude data and the longitude data representing the current location of the own motor vehicle to the transmitting unit 3.

The transmitting unit 3 is a communication device used for CAN communication. The transmitting unit 3 is comprised of a central processing unit (CPU), one or more memories and input/output interface section. The transmitting unit 3 receives the latitude data and the longitude data regarding the current location of the own motor vehicle transmitted from the GPS receiver 2. The transmitting unit 3 converts the received latitude data and the received longitude data, and transmits the converted data to the receiving unit 4 through the CAN bus 6.

In the known CAN communication, data are divided into data frames as packets and the data frames are transmitted. For example, the known CAN communication protocol uses one data frame having 64 bit data size. On the other hand, the in-vehicle communication system 1 according to the exemplary embodiment can transmit latitude data and longitude data of more than 64 bits, for example 72 bit data. It is therefore difficult for the known in-vehicle LAN using the CAN communication protocols to transmit latitude data and longitude data of more than 64 bits by one data frame only.

In order to solve this problem, the transmitting unit 3 in the in-vehicle communication system 1 according to the exemplary embodiment has a conversion processing section 30. The conversion processing section 30 is one of main components of the in-vehicle communication system 1 according to the exemplary embodiment.

The conversion processing section 30 divides each of original latitude data and original longitude data of more than 64 bits which represent the current location of the own motor vehicle into high order data and low order data.

The conversion processing section 30 combines the high order data of the latitude data and the high order data of the longitude data to make a high order frame. The conversion processing section 30 transmits the combined high order frame composed of the high order data of the latitude data and the high order data of the longitude data.

Further, the conversion processing section 30 combines the low order data of the latitude data and the low order data of the longitude data to produce a low order frame. The conversion processing section 30 transmits the low order frame composed of the low order data of the latitude data and the low order data of the longitude data.

This makes it possible to convert the latitude data and the longitude data of more than 64 bits regarding the current location of the own motor vehicle into the data which can be transmitted by using the data frame of the CAN communication protocols.

The processes performed by the conversion processing section 30 in the transmitting unit 3 will be explained later in detail.

Similar to the transmitting unit 3, the receiving unit 4 is an electronic control unit as a CAN communication device equipped with a CPU, one or more memories and input/output interface, etc.

The receiving unit 4 receives the high order frame and the low order frame transmitted from the transmitting unit 3 through the CAN bus 6. The receiving unit 4 in the in-vehicle communication system 1 according to the exemplary embodiment further has a reconstruction processing section 40. The reconstruction processing section 40 is one of the important features of the in-vehicle communication system 1. The reconstruction processing section 40 receives and reconstructs the high order frame and the low order frame transmitted from the transmitting unit 3 into the original latitude data and the original longitude data of the current location. The reconstruction processing section 40 outputs the reconstructed latitude and low order data, i.e. the original latitude data and the original longitude data regarding the current location of the own motor vehicle to the vehicle control section 5. The process performed by the reconstruction processing section 40 in the receiving unit 4 will be explained later in detail.

[Process Performed by the Transmitting Unit 3]

A description will now be given of the conversion process and the transmission process performed by the transmitting unit 3 according to the exemplary embodiment with reference to FIG. 2.

Figure 2:
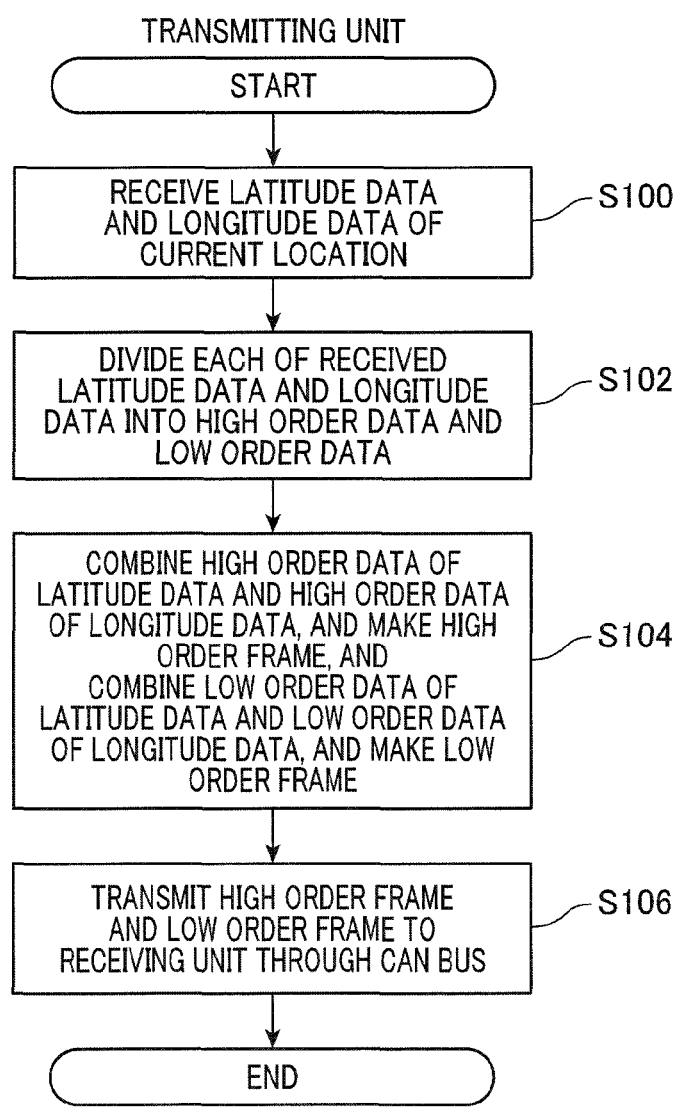
FIG. 2 is a flow chart showing a conversion process and a transmission process performed by a transmitting unit in the in-vehicle communication system according to the exemplary embodiment of the present invention shown in FIG. 1.

FIG. 2 is a flow chart showing the conversion process and the transmission process performed by the transmitting unit 3 in the in-vehicle communication system 1 according to the exemplary embodiment shown in FIG. 1. The conversion processing section 30 in the transmitting unit 3 repeatedly performs the routine shown in the flow chart of FIG. 2 every predetermined control period.

In step S100, the conversion processing section 30 in the transmitting unit 3 receives latitude data and longitude data representing a current location of the own motor vehicle transmitted from the GPS receiver 2. The operation flow goes to step S102.

In step S102, the conversion processing section 30 divides each of the received latitude data and the received longitude data of the current location at a predetermined digit position into high order data and low order data. The operation flow goes to step S104.

In step S104, the conversion processing section 30 combines the high order data of the latitude data and the high order data of the longitude data of the current location, and makes a high order frame. That is, the high order frame is composed of the high order data of the latitude data and the high order data of the longitude data of the current location. Further, the conversion processing section 30 combines the low order data of the latitude data and the low order data of the longitude data of the current location, and makes a low order frame. That is, the low order frame is composed of the low order data of the latitude data and the low order data of the longitude data of the current location.

A description will now be given of the detailed example of the process in step S102 and the process in step S104 performed by the conversion processing section 30 in the transmitting unit 3 with reference to FIG. 3.

Figure 3:
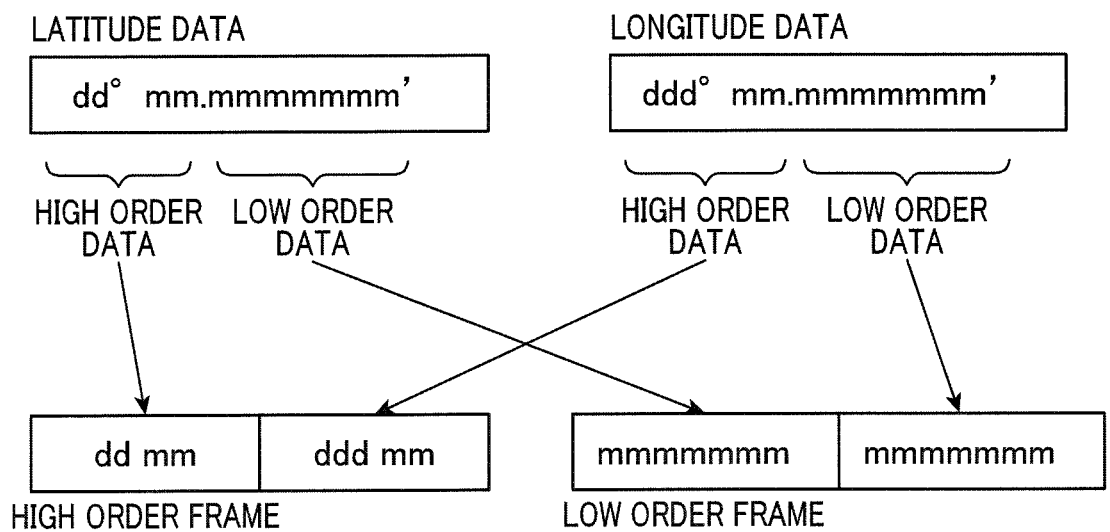
FIG. 3 is a view showing a structure of a high order frame and a low order frame used by CAN communication protocols performed by the in-vehicle communication system according to the exemplary embodiment of the present invention shown in FIG. 1.

FIG. 3 is a view showing a structure of the high order frame and the low order frame used by CAN communication protocols performed by the in-vehicle communication system according to the exemplary embodiment shown in FIG. 1.

As shown in FIG. 3, the latitude data of the current location transmitted from the GPS receiver 2 is composed of a degree component and a second component. The degree component has a two digit integer part. The second component has a two digit integer part and a seven digit decimal point part. Similarly, the longitude data of the current location transmitted from the GPS receiver 2 is also composed of a degree component and a second component. The degree component has a three digit integer part. The second component has a two digit integer part and a seven digit decimal point part.

In the in-vehicle communication system 1 according to the exemplary embodiment, the digits of each of the latitude data and the longitude data representing the current location of the own motor vehicle are divided to the high order data part and the low order data part at the specified point between the integer part and the decimal point part of the second component, as shown in FIG. 3. That is, in each of the latitude data and the longitude data, the high order data contains the integer part of the degree component and the integer part of the second component. On the other hand, the low order data contains the digit decimal point part.

The conversion processing section 30 combines the high order data having the integer part of the degree component and the integer part of the second component of the latitude data with the high order data having the integer part of the degree component and the integer part of the second component of longitude data. The conversion processing section 30 makes the high order frame composed of the combined data regarding the high order data. Further, the conversion processing section 30 combines the low order data having the digit decimal point part of the second component of the latitude data with the low order data having the digit decimal point part of the second component of the longitude data. The conversion processing section 30 makes the low order frame composed of the combined data regarding the low order data.

In the example shown in FIG. 3, each of the latitude data and the longitude data for the current location is separated into the high order data and the low order data at the point between the integer part and the decimal point part of the second component. However, the concept of the present invention is not limited by this. It is possible to divide the digits of each of the latitude data and the longitude data at a specified point so that each of the high order frame having the obtained high order data and the low order frame having the obtained low order data can be adequately fitted to a data field of the data frame to be used by the CAN communication.

In step S106 shown in FIG. 2, the conversion processing section 30 in the transmitting unit 3 sets the high order frame generated in step S104 into a data field of the data frame used by the CAN communication and transmits the high order frame to the CAN bus 6. Further, the conversion processing section 30 sets the low order frame generated in step S104 into the data field of the data frame used by the CAN communication and transmits the low order frame to the CAN bus 6.

The conversion processing section 30 adds a predetermined identifier (ID) into each of the data frames use in step S106 in order to identify the data content and a transmission source. After the completion of the process in step S106, the transmitting unit 3 completes the routine of the flow chart shown in FIG. 2.

[Process Performed by the Receiving Unit 4]

A description will now be given of the receiving process and the reconstruction process performed by the receiving unit 4 according to the exemplary embodiment with reference to FIG. 4.

FIG. 4 is a flow chart showing the receiving process and the reconstruction process performed by the receiving section 4 in the in-vehicle communication system 1 according to the exemplary embodiment shown in FIG. 1.

The reconstruction processing section 40 in the receiving unit 4 repeatedly performs the routine shown in the flow chart of FIG. 4 every predetermined control period.

In step S200 shown in FIG. 4, the reconstruction processing section 40 in the receiving unit 4 receives the data frame containing the high order frame and the data frame containing the low order frame transmitted from the transmitting unit 3 through the CAN bus 6. The operation flow goes to step S202.

In step S202, the reconstruction processing section 40 extracts the high order data and the low order data of the latitude data from the received high order frame and the received low order frame. The reconstruction processing section 40 reconstructs the latitude data on the basis of the extracted high order data and the extracted low order data. Similarly, the reconstruction processing section 40 extracts the high order data and the low order data of the longitude data from the received high order frame and the received low order frame. The reconstruction processing section 40 reconstructs the longitude data on the basis of the extracted high order data and the extracted low order data. The operation flow goes to step S204.

In step S204, the reconstruction processing section 40 compares the latitude data and the longitude data currently obtained in step S202 (i.e. the current latitude data and the current longitude data) with previous latitude data and previous longitude data which have been previously obtained (i.e. the previous latitude data and the previous longitude data). The reconstruction processing section 40 calculates a difference between them. The reconstruction processing section 40 compares the calculated difference with a predetermined threshold value.

When the comparison result in step S204 indicates affirmation ("YES" in step S204), i.e. the calculated difference is not less than the predetermined threshold value, the operation flow goes to step S206.

On the other hand, when the comparison result in step S204 indicates negation ("NO" in step S204), i.e. the calculated difference is less than the predetermined threshold value, the operation flow goes to step S208.

The process in step S204 performed by the reconstruction processing section 40 corresponds to the judgment section used in the claims.

In step S206, the reconstruction processing section 40 corrects the current latitude data and the current longitude data calculated in step S202 by a predetermined method. In this case, it is possible to use the previous latitude data and the previous longitude data previously calculated as the currently detected latitude data and the currently detected longitude data. It is also possible to obtain vehicle data such as a vehicle speed, a steering angle, an acceleration speed, etc. detected by in-vehicle sensors (not shown) through the CAN bus 6, and correct the current latitude data and the current longitude data on the basis of these vehicle data.

Specifically, a moving locus of the own motor vehicle calculated on the basis of the vehicle data is reflected to the previous latitude data and the previous longitude data previously calculated in order to estimate the latitude and the longitude of the current location of the own motor vehicle.

The process in step S206 performed by the reconstruction processing section 40 corresponds to the correction section used in the claims.

A description will now be given of the necessity for the reconstruction processing section 40 to correct the current latitude data and the current longitude data processed in step S206.

It is generally impossible to completely eliminate an incorrect data transmission such as a data transmission delay and loss of data frames caused in the CAN communication, even if the in-vehicle communication system 1 according to the exemplary embodiment having an improved structure and features previously described performs the CAN communication. That is, there is a possibility that a receiving time is shifted, where the high order frame and the low order frame corresponding to a pair of the latitude data and the longitude data is shifted, and the latitude data and the longitude data represent the current location of the own motor vehicle.

When such a receiving time delay occurs between the received high order frame and the received low order frame, there is a possibility of causing an incorrect combination of the high order frame and the low order frame. For example, the receiving unit 4 combines a previous high order frame and a current low order frame and/or a current high order frame and a previous low order frame.

In order to avoid this problem, even if an incorrect data transmission previously described occurs, because the correct data frame contains at least high order digits or low order digits of the latitude and longitude, it is possible for the in-vehicle communication system 1 according to the exemplary embodiment to correct the transmission data. For example, there is a possibility for the following case to generate a large incorrect transmission error.

A description will now be given of the consideration of the following case.

A receiving timing delay occurs between a high order frame (as an integer part) and a low order frame (as a decimal point part) when the latitude of a current location is shifted from 36° 59.9999999° to 37° 00.0000000°. In this case, when the previous high order frame and the current low order frame are combined, there is a possibility that the current latitude has an incorrect value of 36° 59.0000000° instead of a correct value of 36° 59.9999999°. Further, when the current high order frame and the previous low order frame are combined, there is a possibility that the current latitude has an incorrect value of 37° 00.9999999° instead of the correct value of 36° 59.9999999°.

As previously described, there is a possibility of causing a large incorrect value when the data receiving timing of the high order frame and the low order frame is shifted at a time of carry from the decimal point part in the low order data to the integer part of the high order part. In order to eliminate this problem, the reconstruction processing section 40 in the receiving unit 4 of the in-vehicle communication system 1 according to the exemplary embodiment judges that the receiving time of the high order frame and the low order frame is shifted from the correct receiving time when the latitude data and the longitude data currently obtained are out of a permissible movement range of the own vehicle during a predetermined control period of the data receiving and reconstruction process. The reconstruction processing section 40 corrects the latitude data and the longitude data of the current location.

The operation flow goes from step S206 to step S208. In step S208, the reconstruction processing section 40 in the receiving unit 4 outputs the current location of the own motor vehicle to the vehicle control section 5.

On the other hand, when the comparison result in step S204 indicates negation ("NO" in step S204), i.e. the calculated difference is less than the predetermined threshold value, the operation flow goes to step S208. In step S208, the reconstruction processing section 40 outputs the current latitude data and the current longitude data obtained in step S202 as the location information of the own motor vehicle to the vehicle control section 5.

On the other hand, when the comparison result in step S204 indicates affirmation ("YES" in step S204), i.e., the calculated difference is not less than the predetermined threshold value, the operation flow goes to step S206. After the completion of the process in step S206 previously described, the operation flow goes to step S208. In step S208, the reconstruction processing section 40 outputs the corrected latitude data and the corrected longitude data calculated in step S206 as the location information of the own motor vehicle to the vehicle control section 5.

After the completion of the process in step S208, the reconstruction processing section 40 completes the routine of the flow chart shown in FIG. 4.

[Effects]

The in-vehicle communication system 1 according to the exemplary embodiment has the following effects. The conversion processing section 30 in the transmitting unit 3 divides each of the latitude data and the longitude data of the current location of the own motor vehicle detected by the GPS receiver 2 into the high order data and the low order data. The conversion processing section 30 transmits independently the high order frame containing the high order data of the latitude data and the longitude data, and the low order frame containing the low order data of the latitude data and the longitude data. This makes it possible for the transmitting unit 3 to transmit the latitude data and the longitude data of a high resolution to the receiving unit 4 through the CAN bus 6 in the in-vehicle communication network such as the local interconnect network in the CAN communication.

In addition, even if an incorrect data transmission such as a data transmission delay and loss of data frames occurs in one of the high order frame and the low order frame which forms a pair, because the frame correctly received by the receiving unit 4 contains at least one of high order digits or low order digits of the latitude data and the longitude data, this makes it possible to avoid occurrence of an incorrect carry processing of the latitude component and the longitude component of the current location of the own motor vehicle.

The reconstruction processing section 40 in the receiving unit 4 corresponds to the receiving section, the reconstruction section and the output section used in the claims.

When there is a large difference of not less than the predetermined threshold value between the latitude data and the longitude data reconstructed from the high order frame and the low order frame received by the receiving unit 4 and the previous latitude data and the previous longitude data, it is possible for the reconstruction processing section 40 in the receiving unit 4 of the in-vehicle communication system 1 to correct the reconstructed latitude data and the reconstructed longitude data by using a predetermined value. This makes it possible to prevent the transmission of the incorrect latitude and longitude data of the current location having a large error to the vehicle control section 5 even if the receiving time of the high order frame and the receiving time of the low order frame are shifted relative to each other for some reason.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A communication system comprising:
   an acquiring section which acquires latitude data and longitude data of a current location transmitted from a location detection section which detects the current location;
   a dividing section which divides the latitude data and longitude data of the current location acquired by the acquiring section, at a predetermined digit position, into high order data and low order data of the latitude and high order data and low order data of the longitude, respectively;
   a generating section which generates a high order frame and a low order frame in which the high order frame contains the high order data of the latitude and the high order data of the longitude, and the low order frame contains the low order data of the latitude and the low order data of the longitude;
   a transmitting section which transmits the high order frame and the low order frame generated by the generating section, in different transmission data to a predetermined communication network;
   a receiving section which receives the high order frame and the low order frame transmitted from the transmitting section;
   a reconstructing section which extracts and combines the high order data of the latitude in the high order frame and the low order data of the latitude in the low order frame, and extracts and combines the high order data of the longitude in the high order frame and the low order data of the longitude in the low order frame, and reconstructs current latitude data and current longitude data of the current location; and an output section which outputs the current latitude data and the current longitude data of the current location reconstructed by the reconstructing section.

2. The communication system according to claim 1, further comprising a judgment section and a correction section, wherein the judgment section compares the current latitude data and the current longitude data of the current location currently reconstructed by the reconstructing section with previous latitude data and previous longitude data previously constructed by the reconstructing section, and detects whether or not a difference between the current latitude data and the current longitude data and the previous latitude data and the previous longitude data is not less than a predetermined threshold value; and the correction section corrects the current latitude data and the current longitude data by using a predetermined value when the comparison result indicates that the difference is not less than the predetermined threshold value, and the output section outputs the corrected latitude data and the corrected longitude data of the current location when the comparison result indicates that the difference is less than the predetermined threshold value, and the current latitude data and the current longitude data of the current location reconstructed by the reconstructing section when the comparison result indicates that the difference is less than the predetermined threshold value.

3. The communication system according to claim 1, further comprising a transmitting unit comprising the acquiring section, the dividing section, the generating section and the transmitting section.

4. The communication system according to claim 2, further comprising a transmitting unit comprising the acquiring section, the dividing section, the generating section and the transmitting section.

5. The communication system according to claim 1, further comprising a receiving unit comprising the receiving section, the reconstructing section and the output section.

6. The communication system according to claim 2, further comprising a receiving unit comprising the receiving section, the reconstructing section, the judgment section and a correction section and the output section.

* * * * *